(12) United States Patent
Queiroz Da Fonseca et al.

(10) Patent No.: US 11,499,028 B2
(45) Date of Patent: Nov. 15, 2022

(54) EXPANDABLE, EXPANDING-AGENT-CONTAINING GRANULES BASED ON HIGH-TEMPERATURE THERMOPLASTICS

(71) Applicant: BASF SE, Ludwigshafen am Rhein (DE)

(72) Inventors: Isa Alexandra Queiroz Da Fonseca, Ludwigshafen am Rhein (DE); Peter Gutmann, Ludwigshafen am Rhein (DE); Judith Braeuer, Ludwigshafen am Rhein (DE); Georg Graessel, Ludwigshafen am Rhein (DE); Rainer Birli, Ludwigshafen am Rhein (DE); Markus Schmidt, Ludwigshafen am Rhein (DE); Sibylle Burkhart, Ludwigshafen am Rhein (DE); Angelika Keller, Ludwigshafen am Rhein (DE); Florian Hennenberger, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 29 days.

(21) Appl. No.: 16/627,501

(22) PCT Filed: Jul. 25, 2018

(86) PCT No.: PCT/EP2018/070084
§ 371 (c)(1),
(2) Date: Dec. 30, 2019

(87) PCT Pub. No.: WO2019/025245
PCT Pub. Date: Feb. 7, 2019

(65) Prior Publication Data
US 2020/0148851 A1 May 14, 2020

(30) Foreign Application Priority Data
Aug. 4, 2017 (EP) .................. 17184924

(51) Int. Cl.
| | |
|---|---|
| *C08J 9/16* | (2006.01) |
| *C08J 9/18* | (2006.01) |
| *B29B 9/12* | (2006.01) |
| *B29C 44/02* | (2006.01) |
| *B29C 44/34* | (2006.01) |
| *C08J 9/00* | (2006.01) |
| *C08J 9/14* | (2006.01) |
| *C08J 9/232* | (2006.01) |
| *B29B 7/46* | (2006.01) |
| *B29B 7/90* | (2006.01) |
| *B29B 9/06* | (2006.01) |
| *B29K 81/00* | (2006.01) |
| *B29K 507/04* | (2006.01) |
| *B29K 509/02* | (2006.01) |

(52) U.S. Cl.
CPC .............. *C08J 9/18* (2013.01); *B29B 9/12* (2013.01); *B29C 44/02* (2013.01); *B29C 44/3461* (2013.01); *C08J 9/0066* (2013.01); *C08J 9/142* (2013.01); *C08J 9/16* (2013.01); *C08J 9/232* (2013.01); *B29B 7/46* (2013.01); *B29B 7/90* (2013.01); *B29B 9/065* (2013.01); *B29K 2081/06* (2013.01); *B29K 2507/04* (2013.01); *B29K 2509/02* (2013.01); *C08J 2203/12* (2013.01); *C08J 2381/06* (2013.01); *C08J 2481/06* (2013.01)

(58) Field of Classification Search
CPC ........................................ C08J 9/18
See application file for complete search history.

(56) References Cited

U.S. PATENT DOCUMENTS

| | | | | |
|---|---|---|---|---|
| 5,091,126 | A * | 2/1992 | Weber ................ | C08J 9/142 264/53 |
| 7,045,082 | B2 * | 5/2006 | Dietzen .............. | C08J 9/142 264/50 |
| 10,815,354 | B2 * | 10/2020 | Yamamoto .......... | C08J 9/142 |
| 2007/0112081 | A1 * | 5/2007 | Hahn ................. | C08J 9/14 521/56 |

(Continued)

FOREIGN PATENT DOCUMENTS

| | | | |
|---|---|---|---|
| EP | 302862 | * | 3/1989 |
| EP | 0411437 A2 | | 2/1991 |

(Continued)

OTHER PUBLICATIONS

Poly(ethersulfone) flyer (Year: 2015).*

(Continued)

*Primary Examiner* — Irina Krylova
(74) *Attorney, Agent, or Firm* — Faegre Drinker Biddle & Reath LLP

(57) ABSTRACT

Expandable, blowing agent-containing pellets based on high temperature thermoplastics having a glass transition temperature according to ISO 11357-2-1999 of at least 180° C., wherein the expandable, blowing agent-containing pellets comprise at least one nucleating agent and have a poured density according to DIN ISO 697:1982 in the range from 400 to 900 kg/m³ and a mass in the range from 1 to 5 mg/pellet, processes for production thereof and foam particles obtainable therefrom having a glass transition temperature according to ISO 11357-2-1999 of at least 180° C., wherein the expanded foam particles comprise at least one nucleating agent and have a poured density according to DIN ISO 697:1982 in the range from 10 to 200 kg/m³, and particle foams obtainable therefrom and the use thereof for producing components for aviation.

7 Claims, 1 Drawing Sheet

(56) References Cited

U.S. PATENT DOCUMENTS

| | | | |
|---|---|---|---|
| 2007/0112082 A1* | 5/2007 | Hahn | ............... B29B 9/065 521/60 |
| 2009/0108480 A1* | 4/2009 | Schmaus | ............ B29B 9/065 264/12 |
| 2018/0186958 A1 | 7/2018 | Yamamoto et al. | |
| 2019/0024011 A1 | 1/2019 | Braeuer et al. | |
| 2019/0127545 A1 | 5/2019 | Sampath et al. | |
| 2019/0168426 A1 | 6/2019 | Ruckdaeschel et al. | |
| 2019/0202087 A1* | 7/2019 | Lohmann | ............. C08J 9/236 |
| 2019/0203009 A1 | 7/2019 | Keppeler et al. | |
| 2019/0345284 A1 | 11/2019 | Gutmann et al. | |

FOREIGN PATENT DOCUMENTS

| | | | |
|---|---|---|---|
| EP | 1333051 | A2 | 8/2003 |
| EP | 3202837 | A1 | 8/2017 |
| WO | WO-2013092689 | A1 | 6/2013 |
| WO | WO-2014057042 | A1 | 4/2014 |
| WO | WO-2016052604 | A1 | 4/2016 |

OTHER PUBLICATIONS

U.S. Appl. No. 16/303,491, filed Nov. 20, 2018.
U.S. Appl. No. 16/077,957.
U.S. Appl. No. 16/632,230.
International Search Report for PCT/EP2018/070084 dated Sep. 12, 2018.
Written Opinion of the International Searching Authority for PCT/EP2018/070084 dated Sep. 12, 2018.

\* cited by examiner

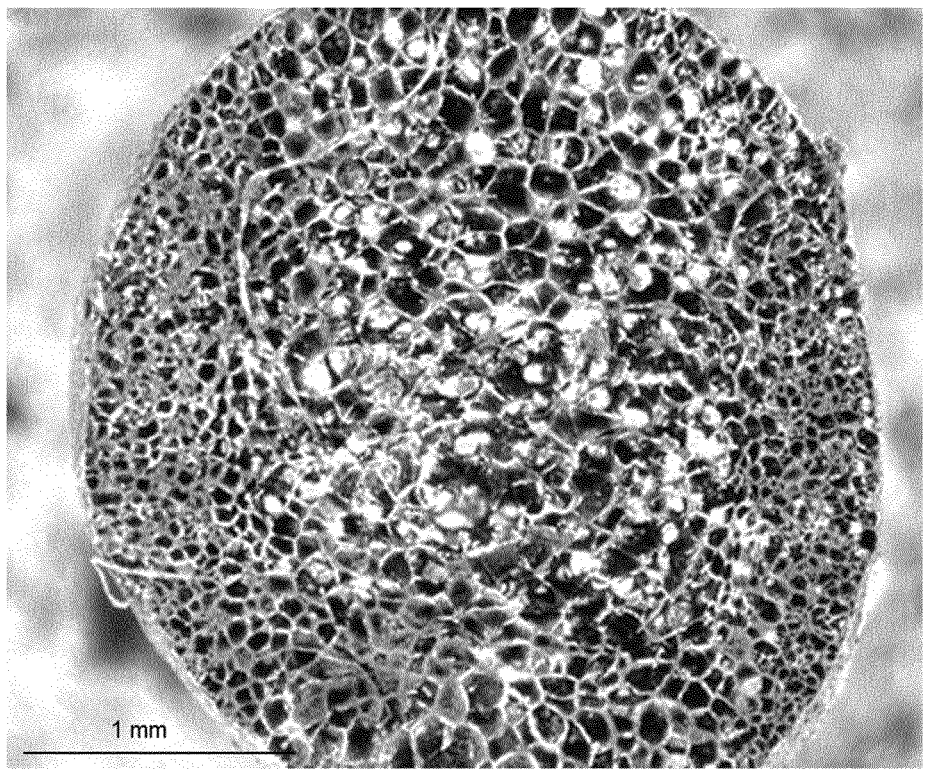

EXPANDABLE, EXPANDING-AGENT-CONTAINING GRANULES BASED ON HIGH-TEMPERATURE THERMOPLASTICS

CROSS-REFERENCE TO RELATED APPLICATIONS

This application is a national stage application (under 35 U.S.C. § 371) of PCT/EP2018/070084, filed Jul. 25, 2018, which claims benefit of European Application No. 17184924.3, filed Aug. 4, 2017, both of which are incorporated herein by reference in their entirety.

The present invention relates to expandable, blowing agent-containing pellets based on high temperature thermoplastics having a poured density according to DIN ISO 697:1982 in the range from 400 to 700 kg/m³ and having a mass in the range from 1 to 5 mg/pellet, processes for the production thereof and expanded foam particles and particle foams obtainable therefrom and the use thereof for producing components for aviation.

WO 2013/092689 describes a process for producing foam sheets by extrusion of a blowing agent-laden polymer melt of polyphenylene ether sulfone (PPSU). It is preferable to employ a mixture of isopropanol as the blowing agent. The obtained foam sheet was subsequently subjected to forming under a vacuum and elevated temperature in a mold to afford a formed foam molding.

WO 2014/057042 describes a high temperature-resistant foam having a homogeneous cell size distribution based on a mixture of polyethersulfones.

EP 1 333 051 A2 describes a process for producing foam webs made of high temperature resistant polysulfones or polyethersulfones by foam extrusion of a mixture of a polysulfone or a polyether sulfone and a volatile blowing agent. It is preferable to employ water or a mixture of water with an alcohol or a ketone as the blowing agent.

EP 0 411 437 describes a process for producing expandable pellets based on polyaryl ether sulfones comprising 5% to 20% by weight based on the pellets of methyl ethyl ketone or acetone as a blowing agent, wherein the blowing agent and the polymers are mixed in an extruder at a barrel temperature of at least 50° C. and at most 170° C. and subsequently extruded directly into a medium having a temperature of less than 40° C. This process is limited to low through-puts. The pellets are pressed into 10 mm thick blowing agent-containing sheets in a positive mold and subsequently foamed to afford a 20 cm thick foam block. Cell diameters are in the range from 0.2 to 0.8 mm.

WO 2016/052604/EP 3 202 837 A1 describes a process for producing particle foams by sintering foam particles made of a polymer having a glass transition temperature of at least 180° C., in particular polyethersulfone (PESU), polyetherimide (PEI), polyphenylsulfone (PPSU) or polysul-fone (PSU). The foam particles preferably have a density in the range from 40 to 900 kg/m³ and average cell diameters in the range of 180-1500 μm. The particle foams obtained therefrom have a high open-cell content in the range from 33% to 64%.

The present invention has for its object to provide storage-stable, expandable pellets based on high temperature-resistant polymers, in particular polyethersulfones, which exhibit a low loss of blowing agent over several weeks' storage time and may be foamed/welded to afford foam particles or particle foams having a low density. In addition the expandable pellets shall be obtainable in high throughputs and should be simply processable into particle foams having a homogeneous, fine-celled cell structure.

The object is achieved by the expandable, blowing agent-containing pellets based on high temperature thermoplastics according to claim 1 and expanded foam particles according to claim 3.

Preferred embodiments are set out in the subsidiary claims.

The expandable pellets are preferably spherical. Spherical is to be understood as meaning that the pellets have no corners or edges, such as are a feature of cylindrical extruded pellets for example. The ratio of shortest to longest diameter of the spherical pellets is preferably in the range from 0.9 to 1.0, particularly preferably in the range from 0.95 to 0.99. Due to their sphericity the preferred expandable blowing agent-containing pellets and the foam particles obtainable by prefoaming are easy to convey and inject into foam molds via pneumatic conveying apparatuses.

The inventive expandable, blowing agent-containing pellets based on high temperature thermoplastics have a poured density according to DIN ISO 697:1982 in the range from 400 to 900 kg/m³, preferably in the range from 450 to 700 kg/m³ and particularly preferably in the range from 500 to 680 kg/m³. They have a mass in the range from 1 to 10 mg/pellet, preferably in the range from 2 to 4 mg/pellet.

Suitable high-temperature thermoplastics are thermoplastic polymers having a glass transition temperature of at least 180° C., preferably in the range from 200° C. to 240° C., determined by DSC according to ISO 11357-2-1999(E) with a heating rate of 10 K/min. The high temperature thermoplastic is preferably at least one polyethersulfone or mixtures of polyethersulfones having different weight-average molecular weights $M_w$ or having different viscosity numbers. It is preferable to use mixtures of a polyethersulfone having a viscosity number in the range from 46 to 50 cm³/g and a polyethersulfone having a viscosity number in the range from 54 to 58 cm³/g measured according to ISO 307, 1157,1628 (in 0.01 g/ml phenol/1,2-ortho-dichlorbenzene, 1:1).

As the blowing agent the expandable pellets comprise alcohols, ketones or hydrocarbons having 1 to 4 carbon atoms, preferably acetone, methyl ethyl ketone, ethanol, isopropanol, isobutane, water or mixtures thereof in amounts of 3% to 15% by weight, preferably in amounts of 5% to 10% by weight, wherein the expandable pellets particularly preferably comprise 3% to 10% by weight of acetone.

It has now been found that, surprisingly, the poured density of the expandable pellets has an effect on blowing agent capacity/storage stability and thus also affects the achievable density reduction during prefoaming. Both the expandable pellets and the expanded foam particles preferably comprise as a nucleating agent talc, titanium dioxide, graphite, carbon black or mixtures thereof. Both the expandable pellets and the expanded foam particles comprise as a nucleating agent preferably 0.01% to 2.0%, particularly preferably 0.05% to 1.5% by weight, of talc, titanium dioxide, graphite, carbon black or mixtures thereof based on the sum of high-temperature thermoplastic and nucleating agents.

Both the expandable pellets and the expanded foam particles preferably comprise exclusively at least one polyethersulfone as the high temperature thermoplastic.

The invention also provides a process for producing expandable, blowing agent-containing pellets based on high temperature thermoplastics comprising the steps of:
 a) producing a polymer melt by melting at least one polymer having a glass transition temperature according to ISO 11357-2-1999 of at least 180° C. and mixing with at least one nucleating agent in an extruder at temperatures in the range from 300° C. to 350° C., b) addition of a blowing agent to the polymer melt
c) cooling the polymer melt to a temperature in the range from 180° C. to 250° C.,
d) optionally conveying the polymer melt by means of a gear pump
e) conveying the blowing agent-laden polymer melt at a temperature in the range from 180° C. to 250° C. through a perforated plate and pelletizing the blowing agent-laden polymer melt in an underwater pelletizer operated at a water temperature in the range from 75° C. to 99° C. and a pressure in the range from 10 to 20 bar.

The steps b) and c) may be performed simultaneously or consecutively. Step c) is preferably performed after step b). This means that the blowing agent-containing polymer melt is cooled to a temperature in the range from 180° C. to 250° C. by addition of the blowing agent and/or external cooling. In this way the blowing agent-containing polymer melt may be passed through a heated die plate and pelletized at a melt temperature in the range from 180° C. to 250° C.

As the blowing agent the process according to the invention may employ alcohols, ketones or hydrocarbons having 1 to 4 carbon atoms, preferably acetone, methyl ethyl ketone, ethanol, isopropanol, isobutane, water or mixtures thereof in amounts of 3% to 15% by weight, preferably in amounts of 5% to 10% by weight, based on the polymer melt including its additives. It is particularly preferable to add 3% to 10% by weight of acetone to the polymer melt.

Nucleating agents or flame retardants may be added to the polymer melt as additives. It is preferable to employ talc, titanium dioxide, graphite, carbon black or mixtures thereof.

The process according to the invention employs the abovementioned thermoplastics as the high temperature thermoplastics. The high temperature thermoplastic is preferably at least one polyethersulfone or mixtures of polyethersulfones having different weight-average molecular weights $M_W$ or having different viscosity numbers. It is preferable to use mixtures of a polyethersulfone having a viscosity number in the range from 46 to 50 cm$^3$/g and a polyethersulfone having a viscosity number in the range from 54 to 58 cm$^3$/g measured according to ISO 307, 1157,1628 (in 0.01 g/ml phenol/1,2-ortho-dichlorbenzene, 1:1).

The high poured density of the expandable pellets in the range from 400 to 900 kg/m$^3$ was achievable through a high water pressure in the underwater pelletization and the choice of the blowing agent and the concentration thereof and the temperature profile in the extrusion apparatus with underwater pelletization.

The invention also provides expanded foam particles based on high temperature, wherein the expandable, blowing agent-containing pellets comprise at least one nucleating agent and have a poured density according to DIN ISO 697:1982 in the range from 10 to 200 kg/m$^3$.

The mean cell diameter of the expanded foam particles according to the invention is generally in the range from 30 to 150 μm, preferably in the range from 50 to 100 μm. It is preferable when 90% of the cells, particularly preferably 99% of the cells, have a cell diameter of less than 150 μm. The average length/breadth ratio is preferably below 2.0, particularly preferably below 1.6.

These are obtainable by prefoaming of the expandable particles. Suitable therefor is a process for producing foam particles based on high temperature thermoplastics which comprises foaming the abovementioned expandable, blowing agent-containing pellets at temperatures in the range from 180° C. to 280° C., preferably in the range from 220° C. to 250° C., for 5 to 300 seconds, preferably 10 to 150 seconds, for example in a recirculating air oven.

The thus-obtainable expanded foam particles may be welded to afford particle foam moldings.

Suitable therefor are processes for producing a particle foam based on high temperature thermoplastics in which the abovementioned expandable blowing agent-containing pellets or expanded foam particles are welded in a mold using steam, hot air, IR or electromagnetic radiation or hot pressing.

The thus-obtained particle foams are generally closed-cell foams. The particle foams preferably have a density in the range from 20 to 250 kg/m$^3$, particularly preferably in the range from 40 to 150 kg/m$^3$.

The foam particles according to the invention are suitable in particular for use in composite sheets for aviation applications.

Due to the high poured density of the expandable blowing agent-containing pellets according to the invention and good storage stability on account of the low loss of blowing agent said pellets may be delivered at low transport costs even over relatively long transport routes to processors which can subject said pellets to prefoaming to afford expanded foam particles and subsequent processing to afford foam moldings having any desired three-dimensional shapes.

EXAMPLES

Raw Materials Employed:
PESU
Ultrason E0510 Polyethersulfone (PESU) from BASF SE, density 1370 kg/m$^3$, viscosity number 40 cm$^3$/g (in 0.01 g/ml phenol/1,2-ortho-dichlorbezene, 1:1), glass transition temperature DSC (10° C./min) 222° C.)
Ultrason E1010 Polyethersulfone (PESU) from BASF SE, density 1370 kg/m$^3$, viscosity number 48 cm$^3$/g (in 0.01 g/ml phenol/1,2-ortho-dichlorbezene, 1:1), glass transition temperature DSC (10° C./min) 222° C.)
Ultrason E2010 Polyethersulfone (PESU) from BASF SE, density 1370 kg/m$^3$, viscosity number 56 cm$^3$/g (in 0.01 g/ml phenol/1,2-ortho-dichlorbezene, 1:1), glass transition temperature DSC (10° C./min) 225° C.)
Talc Microtalk IT extra, Mondo Minerals, average particle size d50%<2 μm)
Graphite Graphit Kropfmuhl AG, average particle size d50%=4.8 μm)
TiO2 Kronos 2220, CAS 13463-67-7
Blowing agent Acetone (acetone 99.97% (balance water) Domo)
Analytical:
The poured density of the blowing agent-containing, expandable pellets was determined according to DIN ISO 697:1982.

The blowing agent content of the expandable pellets was determined by gravimetric means as volatile fractions. To this end about 20 g of the blowing agent-containing pellets were weighed into an aluminum dish, dried at 250° C. for at least 2 hours in a recirculating air oven and reweighed.

Compressive stresses were determined according to DIN EN ISO 844:2014.

Determination of cell size distribution and average cell diameter was carried out by imaging the cross section of the foam particles with a camera and evaluation with PORE!S-CAN from Goldlücke Ingenieurleistungen. To this end, 10 foam particles were attached to a sheet of particle board (10×10 cm) with double-sided adhesive tape and cut in half. To determine the average cell areas and average cell diameters around 1500 cells were evaluated.

Examples 1-26

Production of Expandable PESU Pellets by Melt Impregnation

Melt impregnation was carried out in an apparatus consisting of a twin screw extruder divided into eight zones of equal length (Z1 . . . Z8) from Leistritz having an 18 mm screw diameter and a length to diameter ratio of 40, a melt pump (gear pump GP), diverter valve (DV), melt filter, die plate (DP) and an underwater pelletization (UWP).

Polyethersulfone (PESU) was mixed with the additives (talc, titanium dioxide, graphite) in a polyethylene bag, metered into the twin screw extruder and melted. About 2/3 along the length of the extruder the blowing agent was injected into the extruder in zone Z5 using Isco pumps (piston pumps from Axel Semrau) and an injector built into the extruder. From zone Z6 onward the polymer melt was cooled via the temperature control means of the twin-screw extruder. The temperature of the polymer melt upon passing through the die plate corresponded to the temperature established at zone 8. Using the melt pump (GP) the pressure profile in the extruder was adjusted (pressure-speed control) such that the blowing agent was completely mixed into the polymer melt. In addition to adjustment of the pressure profile in the twin-screw extruder the melt pump is also used for conveying the blowing agent-impregnated polymer melt through the downstream devices (the diverter valve, the melt sieve and the die plate). The melt strand exiting via the die plate (1 hole with 1.0 mm diameter) was cut into expandable polyethersulfone pellets having a pellet weight of about 2.3 mg under pressure in the underwater pelletizer (UWP). The total throughput of the extruder was kept constant at 5 kg/h. The strand in the water box was cut by 10 blades attached to a blade ring. In examples 1-12 the blade ring rotates at 3600 rpm. This forms expandable pellets having a pellet weight of 2.3 mg which are transported by the water circulation from the die plate into the dryer and from there are deposited into a collection vessel (presently a tin can).

The weight fractions of the employed raw materials are reported in table 1. The weight fractions relate to 100% by weight of solids (polymer and additives without blowing agent). The blowing agent fraction relates to 100% by weight of solids (polymer and additives). The process parameters are reported in table 2. The temperatures relate to the temperature values established and measured at the respective apparatus parts.

In examples 1-12, 17, 20-24 acetone was used as the blowing agent. In examples 13-16 and 18-19 mixtures of acetone with water, ethanol or isopropanol were employed in the weight ratio reported in table 1.

In examples 13-23 the knife speed was set to the value reported in table 2. Pellet weights of 2.8 mg (3000 rpm), 2.4 mg (3500 rpm) and 3.3 mg (2500 rpm) were obtained.

Comparative Examples V1 and V2

In comparative examples V1 and V2 the temperature of the blowing agent-containing polymer melt was kept constant and not cooled.

TABLE 1

Employed raw materials for examples 1-12 and comparative experiments V1 and V2 with 100% by weight of solid and the blowing agent in addition

| Example | E1010 [% by weight] | E2010 [% by weight] | E0510 [% by weight] | Mikrotalk IT extra [% by weight] | TiO2 [% by weight] | Graphite [% by weight] | blowing agent [% by weight] | Blowing agent composition |
|---|---|---|---|---|---|---|---|---|
| V1 |  | 99.9 |  | 0.1 |  |  | 8 | Acetone |
| V2 |  | 99.9 |  | 0.1 |  |  | 8 | Acetone |
| 1 |  | 99.9 |  | 0.1 |  |  | 8 | Acetone |
| 2 |  | 99.9 |  | 0.1 |  |  | 8 | Acetone |
| 3 |  |  | 99.9 | 0.1 |  |  | 8 | Acetone |
| 4 | 99.9 |  |  |  |  | 0.1 | 8 | Acetone |
| 5 | 89.9 | 10 |  |  |  | 0.1 | 8 | Acetone |
| 6 | 79.9 | 20 |  |  |  | 0.1 | 8 | Acetone |
| 7 | 69.9 | 30 |  |  |  | 0.1 | 8 | Acetone |
| 8 | 49.5 | 49.5 |  |  | 1.0 |  | 8 | Acetone |
| 9 |  | 99.9 |  |  |  | 0.1 | 8 | Acetone |
| 10 | 99.9 |  |  |  |  |  | 8 | Acetone |
| 11 | 99.5 |  |  |  |  |  | 8 | Acetone |
| 12 | 99.0 |  |  |  |  |  | 8 | Acetone |
| 13 | 99.0 |  |  |  |  | 0.1 |  | Acetone/water 4:1 |
| 14 | 99.0 |  |  |  |  | 0.1 |  | Acetone/water 5:1 |
| 15 | 99.0 |  |  |  |  | 0.1 |  | Acetone/isopropanol 4:1 |
| 16 | 99.0 |  |  |  |  | 0.1 |  | Acetone/ethanol 4:1 |
| 17 | 99.0 |  |  |  |  | 0.1 |  | Acetone/ethanol 4:1 |
| 18 | 99.0 |  |  |  |  | 0.1 |  | Acetone/ethanol 4:1 |
| 19 | 99.0 |  |  |  |  | 0.1 | 10 | Acetone |
| 20 |  | 99.0 |  |  |  | 0.1 | 10 | Acetone |
| 21 | 20 | 79.9 |  |  |  | 0.1 | 10 | Acetone |
| 22 | 49.5 | 49.5 |  |  |  | 0.1 | 10 | Acetone |
| 23 | 79.9 | 20 |  |  |  | 0.1 | 10 | Acetone |

TABLE 1-continued

Employed raw materials for examples 1-12 and comparative experiments V1 and V2 with 100% by weight of solid and the blowing agent in addition

| Example | E1010 [% by weight] | E2010 [% by weight] | E0510 [% by weight] | Mikrotalk IT extra [% by weight] | TiO2 [% by weight] | Graphite [% by weight] | blowing agent [% by weight] | Blowing agent composition |
|---|---|---|---|---|---|---|---|---|
| 24 |  | 49.5 | 49.5 |  |  | 0.1 | 8 | Acetone |
| 25 | 49.5 |  | 49.5 |  |  | 0.1 | 8 | Acetone |
| 26 |  |  | 99.0 |  |  | 0.1 | 8 | Acetone |

TABLE 2

Process parameters from extruder to UWP

| | Temperature of extruder zones [° C.] | | | | | | | | Screw speed [rpm] | GP Temp [° C.] | GP Pressure [bar] | DV Temp [° C.] | DP Temp [° C.] | UWP Temp [° C.] | UWP Pressure [bar] | Through-put [g/h] | Knife speed rpm |
|---|---|---|---|---|---|---|---|---|---|---|---|---|---|---|---|---|---|
| | Z1 | Z2 | Z3 | Z4 | Z5 | Z6 | Z7 | Z8 | | | | | | | | | |
| V1 | 340 | 340 | 340 | 340 | 340 | 340 | 340 | 340 | 320 | 280 | 70 | 320 | 350 | 95 | 13.2 | 5000 | 3600 |
| V2 | 340 | 340 | 340 | 340 | 340 | 340 | 340 | 340 | 320 | 280 | Ex. | 320 | 350 | 95 | 13.4 | 5000 | 3600 |
| 1 | 340 | 340 | 340 | 340 | 320 | 255 | 255 | 255 | 240 | 280 | 63 | 270 | 350 | 95 | 13.4 | 5000 | 3600 |
| 2 | 340 | 340 | 340 | 340 | 320 | 220 | 215 | 215 | 215 | 265 | 75 | 265 | 350 | 95 | 13 | 5000 | 3600 |
| 3 | 340 | 340 | 340 | 340 | 320 | 220 | 215 | 215 | 215 | 265 | 75 | 265 | 350 | 95 | 13 | 5000 | 3600 |
| 4 | 340 | 340 | 340 | 340 | 300 | 205 | 205 | 205 | 215 | 265 | 100 | 265 | 340 | 95 | 13 | 5000 | 3600 |
| 5 | 340 | 340 | 340 | 340 | 300 | 205 | 205 | 205 | 215 | 265 | 100 | 265 | 340 | 95 | 13 | 5000 | 3600 |
| 6 | 340 | 340 | 340 | 340 | 300 | 205 | 205 | 205 | 215 | 265 | 100 | 265 | 340 | 95 | 13 | 5000 | 3600 |
| 7 | 340 | 340 | 340 | 340 | 300 | 205 | 205 | 205 | 215 | 265 | 100 | 265 | 340 | 95 | 13 | 5000 | 3600 |
| 8 | 340 | 340 | 340 | 340 | 320 | 225 | 225 | 215 | 215 | 265 | 75 | 265 | 340 | 78 | 13 | 5000 | 3600 |
| 9 | 340 | 340 | 340 | 340 | 320 | 225 | 225 | 215 | 215 | 265 | 75 | 265 | 340 | 78 | 13 | 5000 | 3600 |
| 10 | 340 | 340 | 340 | 340 | 320 | 225 | 225 | 215 | 215 | 265 | 75 | 265 | 340 | 78 | 13 | 5000 | 3600 |
| 11 | 340 | 340 | 340 | 340 | 320 | 225 | 225 | 215 | 215 | 265 | 75 | 265 | 340 | 78 | 13 | 5000 | 3600 |
| 12 | 340 | 340 | 340 | 340 | 320 | 225 | 225 | 215 | 215 | 265 | 75 | 265 | 340 | 78 | 13 | 5000 | 3600 |
| 13 | 340 | 340 | 340 | 340 | 300 | 205 | 205 | 205 | 215 | 265 | 100 | 265 | 340 | 95 | 13 | 5000 | 3000 |
| 14 | 340 | 340 | 340 | 340 | 300 | 205 | 205 | 205 | 215 | 265 | 100 | 265 | 340 | 95 | 13 | 5000 | 3000 |
| 15 | 340 | 340 | 340 | 340 | 300 | 205 | 205 | 205 | 215 | 265 | 100 | 265 | 340 | 80 | 13 | 5000 | 3000 |
| 16 | 340 | 340 | 340 | 340 | 300 | 205 | 205 | 205 | 215 | 265 | 100 | 265 | 340 | 80 | 13 | 5000 | 3000 |
| 17 | 340 | 340 | 340 | 320 | 233 | 195 | 190 | 190 | 190 | 250 | 100 | 225 | 265 | 67 | 13.8 | 5000 | 3000 |
| 18 | 340 | 340 | 340 | 320 | 233 | 195 | 190 | 190 | 190 | 250 | 100 | 225 | 265 | 67 | 13.8 | 5000 | 3000 |
| 19 | 340 | 340 | 340 | 320 | 233 | 195 | 190 | 190 | 190 | 250 | 100 | 225 | 265 | 67 | 13 | 5000 | 3500 |
| 20 | 320 | 340 | 340 | 320 | 275 | 210 | 205 | 205 | 215 | 260 | 110 | 225 | 240 | 58 | 14.5 | 5000 | 2500 |
| 21 | 320 | 340 | 340 | 320 | 275 | 210 | 205 | 205 | 215 | 260 | 110 | 225 | 240 | 57 | 14.6 | 5000 | 2500 |
| 22 | 320 | 340 | 340 | 320 | 275 | 210 | 205 | 205 | 215 | 260 | 110 | 225 | 240 | 57 | 14.6 | 5000 | 2500 |
| 23 | 320 | 340 | 340 | 320 | 275 | 210 | 190 | 205 | 215 | 260 | 110 | 225 | 240 | 57 | 14.7 | 5000 | 2500 |
| 24 | 340 | 340 | 340 | 340 | 300 | 205 | 205 | 205 | 215 | 265 | 100 | 265 | 340 | 95 | 13 | 5000 | 3600 |
| 25 | 340 | 340 | 340 | 340 | 300 | 205 | 205 | 205 | 215 | 265 | 100 | 265 | 340 | 95 | 13 | 5000 | 3600 |
| 26 | 340 | 340 | 340 | 340 | 300 | 205 | 205 | 205 | 215 | 265 | 100 | 265 | 340 | 95 | 13 | 5000 | 3600 |

TABLE 3

Poured density of the expandable pellets after production and blowing agent concentration in the expandable pellets over the storage time

| Experiment | Bulk density (g/l) | Blowing agent (%) | | | | |
|---|---|---|---|---|---|---|
| | | injected | Week 1 | Week 4 | Week 8 | Week 12 |
| V1 | 329 | 8 | 6.9 | 6.3 | 5.1 | 4.6 |
| V2 | 269 | 8 | 7.1 | 5.5 | 4.6 | |
| 1 | 600 | 8 | 7.1 | 6.8 | 6.4 | 6.3 |
| 2 | 545 | 8 | 7.6 | 6.7 | 6.3 | |
| 3 | 546 | 8 | 7.9 | 6.7 | 6.2 | |

Production of the PESU Foam Particles

The expandable pellets from the examples 1-3 were foamed to afford foam particles in a recirculating air oven as follows.

1.) The oven is set to 230° C., since otherwise it takes too long to achieve the temperature of 220° C., and 2 aluminum dishes (about 500 ml) are placed in the oven to likewise be brought to temperature.

2.) Once the oven indicates a temperature of 225° C. about 6 g of expandable pellets are divided among the two aluminum dishes by opening the oven door and pouring the pellets into the aluminum dishes from a cupped hand or a small plastic container. Care is taken to ensure that the particles are not heaped.

The opening of the oven door causes the temperature in the oven to fall by about 5° C. to 220° C.

The setting of 230° C. also ensures that the temperature does not fall further.

3.) A stopwatch is started upon closing the oven door and after a defined time (here 60 s and 120 s) said door is reopened and the aluminum dishes containing the expanded pellets are removed and placed on the laboratory bench to cool.

4.) Once the aluminum dishes containing the pellets have cooled the poured density is measured analogously to DIN ISO 697:1982. The method is analogous because a 50 ml measuring beaker is used since measurement precisely according to the standard would require too many pellets to be foamed.

The measured poured densities after foaming of the expandable pellets in week 1 are shown in table 4.

FIG. 1 shows a cross section with cell distribution through a foam particle foamed to a density of 81 g/l according to example 1. The average cell diameter was 64 μm. 99% of the cells have a cell diameter of less than 150 μm and 90% of the cells have a cell diameter of less than 110 μm. The average length/breadth ratio of the cells was 1.4.

TABLE 4

Poured densities before foaming and after foaming week 1

| Example | Poured density before foaming (g/l) | Pouring density after foaming (g/l) 220° C., 30 s | 220° C., 60 s | 220° C., 120 s |
|---|---|---|---|---|
| V1 | 329 |  | 280 | 266 |
| V2 | 244 |  | 340 |  |
| 1 | 600 |  | 104 | 85 |
| 4 | 660 | 46 | 44 | 45 |
| 5 | 680 | 43 | 49 | 63 |
| 6 | 676 | 51 | 49 | 65 |
| 7 | 674 | 45 | 44 | 61 |
| 8 | 622 | 87 | 79 | 89 |
| 9 | 580 | 86 | 95 | 108 |
| 10 | 618 | 54 | 54 | 79 |
| 11 | 602 | 60 | 64 | 87 |
| 12 | 592 | 66 | 89 | 100 |
| 13 | 512 | 74 | 87 | 132 |
| 14 | 457 | 79 | 76 | 125 |
| 15 | 561 | 51 | 45 | 49 |
| 16 | 643 | 64 | 63 | 75 |
| 17 | 703 | 27 | 24 | 27 |
| 18 | 617 | 37 | 35 | 56 |
| 19 | 770 | 26 | 24 | 23 |
| 20 | 680 | 27 | 29 | 35 |
| 21 | 700 | 26 | 27 | 34 |
| 22 | 705 | 24 | 26 | 26 |
| 23 | 712 | 27 | 23 | 23 |
| 24 | 640 | 52 | 42 | 41 |
| 25 | 690 | 42 | 44 | 43 |
| 26 | 697 | 39 | 40 | 40 |

Production of PESU Particle Foam Sheets

Foam particles from examples 19-22 were filled into a mold having interior dimensions of 200×300×12 mm and using steam welded to afford foam sheets in a high-pressure molding machine. Densities and compressive stresses at different compressions are reported in table 5.

TABLE 5

Mechanical properties of foam sheets

| Example | Compressive stress at 10% compression [kPa] | Compressive stress at 25% compression [kPa] | Compressive stress at 50% compression [kPa] | Density [g/l] | Thickness [mm] |
|---|---|---|---|---|---|
| 19 | 326 | 409 | 573 | 78 | 12 |
|  | 152 | 206 | 311 | 50 | 12 |
| 20 | 434 | 597 | 898 | 80 | 12 |
|  | 181 | 279 | 433 | 48 | 12 |
| 22 | 423 | 561 | 792 | 80 | 12 |
|  | 156 | 297 | 440 | 45 | 12 |

The invention claimed is:

1. A process for producing expandable, blowing agent-containing pellets based on high temperature thermoplastics comprising the steps of:
   a) producing a polymer melt consisting of at least one polyethersulfone by melting the at least one polyethersulfone having a glass transition temperature according to ISO 11357-2-1999 of at least 180° C. and mixing with at least one nucleating agent in an extruder at temperatures in the range from 320° C. to 350° C.,
   b) adding a blowing agent to the polymer melt,
   c) cooling the blowing agent-containing polymer melt to a temperature in the range from 180° C. to 215° C.,
   d) optionally conveying the polymer melt by means of a gear pump,
   e) conveying the blowing agent-containing polymer melt at a temperature in the range from 180° C. to 215° C. through a perforated plate and pelletizing the blowing agent-laden polymer melt in an underwater pelletizer operated at a water temperature in the range from 75° C. to 99° C. and a pressure in the range from 10 to 20 bar.

2. The process according to claim 1, wherein acetone, isobutane, ethanol, isopropanol, water or mixtures thereof are employed as the blowing agent.

3. The process according to claim 2, wherein acetone is used as the blowing agent and the expandable blowing agent containing pellets comprise 3% to 15% by weight of the acetone.

4. The process according to claim 1, wherein talc, titanium dioxide, graphite, carbon black or mixtures thereof are employed as the nucleating agent.

5. The process according to claim 4, wherein the expandable blowing agent containing pellets comprise as the nucleating agent 0.01% to 2.0% by weight of the talc, the titanium dioxide, the graphite, the carbon black or mixtures thereof based on the sum of the high temperature thermoplastics and the nucleating agent.

6. The process according to claim 1, wherein mixtures of polyethersulfones having different average molecular weights $M_w$ are employed as the polymer.

7. The process according to claim 1, wherein the expandable, blowing-agent containing pellets have a poured density according to DIN ISO 697:1982 in the range from 400 to 900 kg/m³ after the pelletizing.

* * * * *